March 20, 1928.
A. B. COOK
MEASURING RULER
Filed April 4, 1927
1,663,293
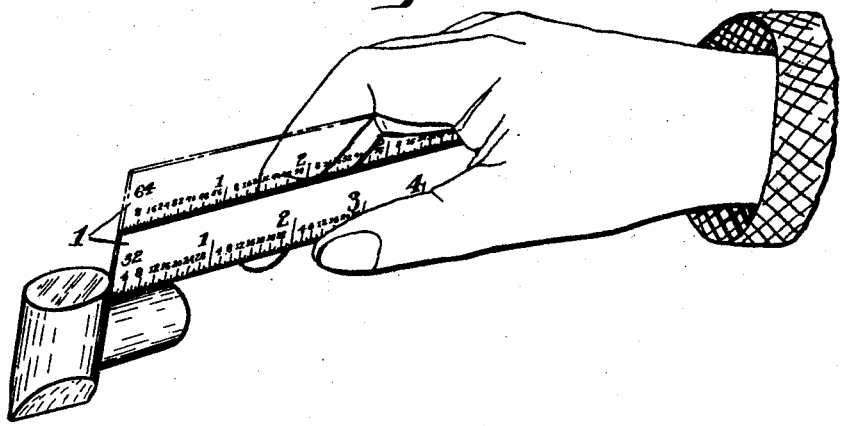
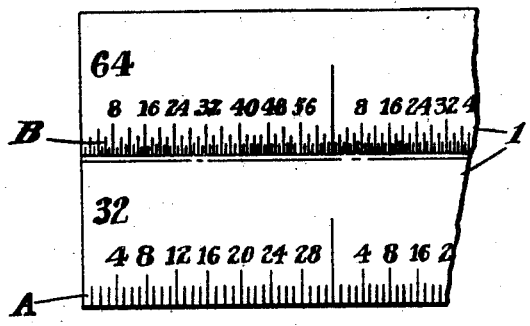
Inventor
Alvin B. Cook
By [signature]
Attorney Patented Mar. 20, 1928.

1,663,293

UNITED STATES PATENT OFFICE.

ALVIN B. COOK, OF ATHOL, MASSACHUSETTS, ASSIGNOR TO THE L. S. STARRETT COMPANY, OF ATHOL, MASSACHUSETTS, A CORPORATION OF MASSACHUSETTS.

MEASURING RULER.

Application filed April 4, 1927. Serial No. 180,689.

My invention relates to rulers or like measuring devices and particularly to such devices for use by machinists in taking off close dimensions.

Rules of this type are frequently made "direct reading," so-called, so that the finer graduations may be quickly read. In such work it is customary to have at least two sets of differentiated graduations, for example, reading in 32nds or 64ths or other fractions. Where these have been placed on opposite sides of the same edge of the rule it has precluded, on account of the weakening effect of the indentations, the manufacture of these rules of thin stock. The use of thin rules or slightly flexible rules has considerable advantage but it has not been found possible heretofore to produce in a single rule the desired combined features, such as thinness, flexibility, variant graduations and particularly direct reading graduations.

One of the difficulties of the usual rule structure has been that if a mechanic desired to shift from one scale to another, he was obliged to reverse his ruler end for end. This was an awkward movement and interfered with quick work, and frequently involved the dropping of the rule or an awkward delay in making the measurement.

My present invention provides for a rule in which a number of the desired features are made possible in combination without any of the undesirable effects that have been supposed necessarily incident to their use.

As illustrative of my invention I show a simple form of rule of very high practical efficiency in which I have been able to combine ready reversibility of the rule from scale to scale in an embodiment in which the rule is thin and flexible and in which no material sacrifice of strength has been made. Such an embodiment I have illustrated in the accompanying drawings, in which Fig. 1 is an illustrative view of the rule in use and Fig. 2 is a development showing the two sides of the rule as exposed in turning over.

In the form shown, my rule is made of thin flexible stock constituting a strip 1. This may be of any width or length in accordance with the usual practice in making flexible steel rules. The strip 1 may be variously inscribed and graduated as at A and B. As shown, these are 32nds and 64ths respectively, although of course any graduations may be put on the rule. These graduations are selected because they represent typical fine graduations which are commonly used by machinists in making such measurements. It will be noted in Figs. 2 and 3 that the graduations A and B in intaglio are disposed on opposite edges of the two sides of the rule. These graduations are therefore not superimposed and do not tend to add the weakening of the graduation depressions on one edge, but distribute them at the two edges which in a thin flexible rule would make it crack on flexing. Furthermore, it will be seen that the rule may be simply turned over as distinguished from being reversed, so that the mechanic by simply rolling the rule between his fingers without changing his grip thereon is able to expose either set of graduations in the same reading position and sequence as is illustrated in Fig. 1.

Commercially these rules constitute a new type and have been immediately recognized as of great utility, while their manufacture has proven possible even in the flexible types with assurance against edge cracking or roughing. While the several factors of this new rule are old and well known in the art they combine to give new possibilities and new utilities.

What I therefore claim and desire to secure by Letters Patent is:

1. A rule comprising a flat relatively thin flexible strip having only two series of differentiated graduations thereon, one series extending along one longitudinal edge of the front face of the rule and the other series extending along the opposite longitudinal edge of the back face of the rule and in non-superimposed relation to the graduations on the front face, and both series of graduations reading from the same end of the rule so that by turning the rule on its longitudinal axis either series of graduations may be alternately exposed in the same relative reading position and sequence for direct observation.

2. A rule comprising a flat relatively thin flexible strip having only two differentiated series of graduations thereon, one series extending along one longitudinal edge of the front face of the rule and the other series extending along the opposite longitudinal edge of the back face of the rule and in non-superimposed relation to the graduations on the front face, one series being a multiple of the other and both series of graduations reading from the same end of the rule so that by turning the rule on its longitudinal axis either series of graduations may be alternately exposed in the same relative reading position and sequence for direct observation.

In testimony whereof I affix my signature.

ALVIN B. COOK.